(12) United States Patent
Mallika

(10) Patent No.: US 8,776,109 B2
(45) Date of Patent: Jul. 8, 2014

(54) HANDLING DISRUPTION IN CONTENT STREAMS RECEIVED AT A PLAYER FROM A CONTENT RETRANSMITTER

(75) Inventor: N. Naga Mallika, Hyderabad (IN)

(73) Assignee: Sling Media Pvt Ltd, Bangalore (IN)

( * ) Notice: Subject to any disclaimer, the term of this patent is extended or adjusted under 35 U.S.C. 154(b) by 206 days.

(21) Appl. No.: 12/909,206

(22) Filed: Oct. 21, 2010

(65) Prior Publication Data

US 2012/0102521 A1    Apr. 26, 2012

(51) Int. Cl.
*H04N 21/4722* (2011.01)
(52) U.S. Cl.
USPC ............................. 725/32; 725/96; 348/14.12
(58) Field of Classification Search
None
See application file for complete search history.

(56) References Cited

U.S. PATENT DOCUMENTS

| | | | | |
|---|---|---|---|---|
| 7,602,820 | B2 * | 10/2009 | Helms et al. | 370/535 |
| 7,970,920 | B1 * | 6/2011 | Dinan | 709/230 |
| 2001/0055302 | A1 * | 12/2001 | Taylor et al. | 370/386 |
| 2003/0046704 | A1 * | 3/2003 | Laksono et al. | 725/96 |
| 2006/0109915 | A1 * | 5/2006 | Unger | 375/240.27 |
| 2007/0079325 | A1 * | 4/2007 | de Heer | 725/32 |
| 2008/0109865 | A1 * | 5/2008 | Su et al. | 725/116 |
| 2009/0171995 | A1 * | 7/2009 | Silvester et al. | 707/101 |
| 2009/0178074 | A1 * | 7/2009 | Ellis | 725/28 |
| 2010/0269128 | A1 * | 10/2010 | Gordon | 725/25 |
| 2010/0299552 | A1 * | 11/2010 | Schlack et al. | 714/4 |
| 2011/0022705 | A1 * | 1/2011 | Yellamraju et al. | 709/224 |
| 2012/0023155 | A1 * | 1/2012 | Myers et al. | 709/203 |
| 2012/0036051 | A1 * | 2/2012 | Sachson | 705/30 |
| 2012/0157043 | A1 * | 6/2012 | LaJoie et al. | 455/407 |

* cited by examiner

*Primary Examiner* — John Schnurr
*Assistant Examiner* — Cynthia Fogg
(74) *Attorney, Agent, or Firm* — Seed IP Law Group PLLC

(57) ABSTRACT

A player receives encoded content of a first resolution level from a content retransmitter and monitors bandwidth of the communication connection utilized to receive the content. When the bandwidth changes with respect to various threshold values corresponding to various resolution levels, the player signals the content retransmitter to increase or decrease the encoding resolution for future portions. The player also locates related substitute content. When the player signals the content retransmitter to decrease the resolution below a minimum, the player plays the substitute content instead of the received content. Subsequently when the bandwidth is again such that player signals the content retransmitter to increase the resolution to the minimum or above, the player plays the received content instead of the substitute content. In various implementations, the player may obtain substitute content prior to or at the time the player determines to play substitute content.

16 Claims, 6 Drawing Sheets

HANDLING DISRUPTION IN CONTENT STREAMS RECEIVED AT A PLAYER FROM A CONTENT RETRANSMITTER

FIELD OF THE INVENTION

This disclosure relates generally to content retransmission, and more specifically to the handling of disruptions that occur in content streams received at a player device from a content retransmitter.

SUMMARY

The present disclosure discloses systems and methods for handling disruption in content streams received at a player device from a content retransmitter. A player application may receive encoded content having a first resolution level from a content retransmitter. The player application may monitor the bandwidth of the communication connection utilized to receive the content. When the bandwidth rises above various threshold values corresponding to various resolution levels, the player application may signal the content retransmitter to increase the resolution for encoding future portions. To the contrary, when the bandwidth falls below various other threshold values corresponding to various other resolution levels, the player application may signal the content retransmitter to decrease the encoding resolution for future portions. The player application may also locate related substitute content. When the player application signals the content retransmitter to decrease the resolution below a minimum threshold resolution level, the player application may play the substitute content instead of the received content. Subsequently when the available bandwidth is again sufficient, the player application signals the content retransmitter to increase the resolution to the minimum threshold resolution level or above and the player application may play the received content instead of the substitute content.

In various implementations, the player application may locate and obtain substitute content related to the received content prior to determining to play substitute content. In such implementations, the player application may obtain such substitute content and store it in a storage medium until it is needed. In other implementations, when the player application determines to play substitute content, the player application may then locate and obtain substitute content to play.

When locating substitute content, the player application may determine one or more characteristics of the received content by any one of: analyzing metadata that is included in the received content; analyzing metadata that describes the received content; analyzing captioning data for the received content; performing audio recognition on the received content; performing image recognition on the received content; and so on. The player application may then locate related substitute content by searching available content based on the determined characteristics and/or one or more sets of user preferences regarding searching for substitute content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
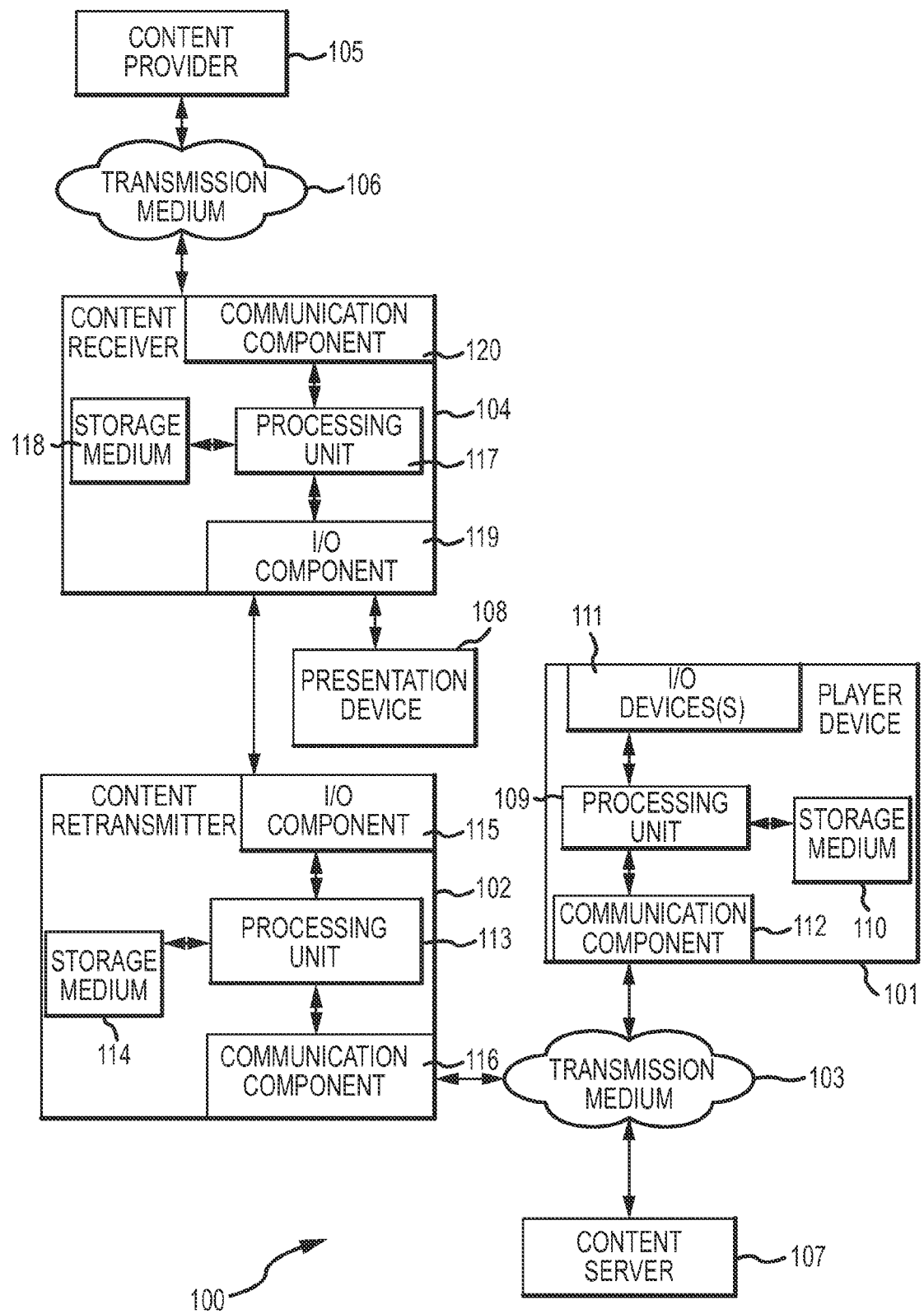
FIG. 1 is a block diagram illustrating a system for handling disruption in one or more content streams received at a player device from a content retransmitter.

The description that follows includes sample systems, methods, and computer program products that embody various elements of the present disclosure. However, it should be understood that the described disclosure may be practiced in a variety of forms in addition to those described herein.

Content retransmitters, such as the Slingbox® marketed by Sling Media®, typically receive content such as one or more television programs, movies, and so on; from a content receiver such as a set top box, a cable box, a digital video recorder, a digital video disc (DVD) player and so on; and retransmit or stream the content to an associated player device such as a desktop computing device, a laptop computing device, a tablet computer device, a cellular telephone, a personal digital assistant, and so on. The content received from the content receiver is generally obtained by the content receiver from a content provider, such as a cable television provider, a satellite television provider, an on-demand movie provider, an Internet service provider, DVD distributor, and so on. The owner of the content receiver and content retransmitter may then use a player application (such as the SlingPlayer™ or SlingPlayer Mobile™ applications marketed by Sling Media®) operating on or in conjunction with the associated player device to connect to the content retransmitter in order to receive and view the content, essentially enabling viewing of the content remote from the content receiver.

The content retransmitter encodes the content before retransmitting such content to the player device. The content is encoded according to a number of parameters such as resolution, streaming bit rate, frame rate, and so on. As the player device receives the encoded content, it utilizes the player application to decode, render, and/or play the content received from the content retransmitter. Further, the content retransmitter may alter the encoding parameters during transmission at the direction of the player application. The amount of content that the player application is able to receive, decode, render, and/or play may vary over a period of time. For instance, the complexity of the content being transmitted may vary. Additionally, the available resources of the player device for decoding, rendering, and/or playing may vary over time. Moreover, the bandwidth of the communication connection by which the player device receives the content may vary over time. Due to the variance of these factors over time, the player application may monitor content as it is received and may signal the content retransmitter to alter various encoding parameters for future portions of content.

For example, a player application may utilize various methods for responding to changes in the bandwidth of the associated communication connection. One such method, handles changes in bandwidth by signaling the content retransmitter to alter the frame rate and/or streaming bit rate utilized to encode the content, effectively changing the resolution of the received content.

However, although a decrease in the resolution of the received content may be necessary or useful due to reasons such as limitations in bandwidth, the decreased resolution of the received content should not be reduced so far as to lack acceptable quality for viewing. For example, the decreased resolution may be so low that it causes unacceptable compression artifacts in the played content. These compression artifacts may include ringing, contouring, posterizing, staircase noise along curving edges, blockiness in busy regions (also known as "quilting" or "checkerboarding"), picture break-up, ghost imaging effect, mosquito noise, and so on. When a user utilizing a player application views playing content of a lower resolution than a minimum acceptable resolution, the user may become so dissatisfied with the quality of the playing content that they cease viewing. As a result of such dissatisfactory experiences, the user may avoid utilizing the player application in future.

The present disclosure discloses systems, methods, and computer program products for handling disruption in content streams received at a player device from a content retransmitter. A player application executing on a player device may receive content encoded at a first resolution level from a content retransmitter via a communication connection. The player application may monitor the bandwidth of the communication connection during receipt of the encoded content. When the bandwidth rises above or decreases below various threshold values corresponding to various resolution levels, the player application may signal the content retransmitter to appropriately increase or decrease the resolution for encoding of future portions of the content. The player application may also locate substitute content that is related to the received content and obtain such substitute content. When the player application signals the content retransmitter to decrease the resolution of the content to a resolution level below a minimum threshold resolution level, the player application may play the substitute content instead of the received content. Therefore, although the player application may play substitute content that is related to the user's desired content when the user's desired content is of an unacceptable quality, the user may continue utilizing the player application to view the related substitute content instead of becoming dissatisfied with unacceptable quality content. Hence the user may spend more time utilizing the player application.

FIG. 1 is a block diagram illustrating a system 100 for handling disruption in content streams received at a player device from a content retransmitter. The system 100 includes a player device 101, a content retransmitter 102, one or more content receivers 104, one or more content providers 105, and one or more content servers 107. The player device may be communicably coupled to the content retransmitter and/or the content server via one or more transmission media 103 (which may include any kind of wired or wireless transmission media such as a satellite connection, an Internet connection, a cellular connection, a local area network connection, a Bluetooth™ connection, a WiFi connection, a HomePlug™ connection, and so on). The content receiver likewise may be communicably coupled to the content provider via one or more transmission media 106.

The player device 101 may be a computing device such as a cellular telephone, a laptop computer, a desktop computer, a personal digital assistant, a tablet computer, a mobile computer, and so on. The player device 101 may include one or more processing units 109, one or more storage media 110, one or more input/output devices 111 (such as a keyboard, a keypad, a touch screen, a mouse, a button, a track pad, a display screen, a speaker, and so on), and/or one or more communication components 112. The storage media may be any non-transitory machine-readable medium and may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on. The processing unit may execute instructions stored in the storage medium in order to implement a player application. The player application may receive encoded content from the content retransmitter 102 via the communication component and may decode, render, and/or play such content utilizing the input/output device(s).

The content retransmitter 102 also may include one or more processing units 113, one or more storage media 114 (which may be any non-transitory machine-readable storage media), one or more input/output components 115, and/or one or more communication components 116. The processing unit may execute instructions stored in the storage medium in order to receive content from the content receiver 104 utilizing the input/output component, encode such content according to various encoding parameters, and retransmit the encoded content to the player device 101 via the communication component.

The content receiver 104 may be any kind of content receiver; such as a set top box, a cable box, a television receiver, a digital video recorder, a cellular telephone, a laptop computer, a desktop computer, a mobile computer, a DVD player, and so on. The content receiver may include one or more processing units 117, one or more storage media 118 (which may be any non-transitory machine-readable storage media), one or more input/output components, and one or more communication components 120. The content receiver may receive content (such as one or more television programs, movies, video on demand programs, an so on) from the content provider 105 (which may be any kind of content provider such as a satellite television provider, a cable television provider, an Internet service provider, a video on demand provider, a DVD retailer, and so on) via the communication component. The processing unit of the content receiver may execute instructions stored in the storage medium in order to store content received from the content provider in the storage medium, present the received and/or stored content on an associated presentation device 108, transmit the received and/or stored content to the content retransmitter 102 via the input/output component, and so on.

While the player application receives encoded content from the content retransmitter 102, the player application may monitor the bandwidth of the communication connection utilized via the communication component 112 to receive the encoded content. In some implementations, the player application may monitor the bandwidth by monitoring the number of frames that are dropped during receiving, decoding, rendering, and/or playing the encoded content; measuring the number of bits received over a period of time; and so on. The player application may utilize various methods for responding to changes in the bandwidth and may signal the content retransmitter to alter the resolution level (such as by altering the frame rate and/or the streaming bit rate) utilized to encode future portions of the content.

By way of example, if received content is encoded at a high definition resolution mode and bandwidth is less than 200 kilobits per second (kbps) but greater than 100 kbps, the player application may signal the content retransmitter to decrease the resolution level utilized to encode future portions to a standard definition resolution mode. In this example, the high definition resolution mode may be video graphics array resolution, which may be 480p (progressive scan), and the standard definition resolution mode may be quarter video graphics (QVGA) array resolution, which may be 240i (interlaced). Subsequently, if the bandwidth is no longer less than 200 kilobits per second (kbps), the player application may signal the content retransmitter to increase the resolution level utilized to encode future portions to the high definition resolution mode. However, if subsequently the bandwidth falls below 100 kbps, the player application may signal the content retransmitter to decrease the resolution level utilized to encode future portions to a low definition resolution mode. The low definition resolution mode may be a quarter-QVGA resolution, which may be 120p.

Additionally, the player application may locate and obtain substitute content which is not identical to the received content, but is related to the received content. For example, if the received content is video of a news show from a particular television station, substitute content may be a different news show from a different television station. The player application may locate substitute content by determining one or more characteristics of the content and searching available content based on the one or more characteristics. The characteristics may include a type of the content, a description of the content, a rating of the content, a title of the content, and so on. The player application may search available content of the player device 101 and/or the content server 107; which may be a content provider such as the content provider 105, an Internet search engine, a content database, and so on. In some implementations, the content server may be maintained by a third-party. Once the substitute content is located in the available content, the player application may retrieve it. The search of available content may be guided by one or more user preferences regarding substitute content. When the player application signals the content retransmitter 102 to decrease the resolution to a resolution level that is below a minimum threshold resolution level, the player application may play the substitute content instead of the received content. Subsequently, when the player application signals the content retransmitter to increase the resolution to a resolution level that is not below the minimum threshold resolution level, the player application may return to playing the received content. For example, the minimum threshold resolution level may be the SD mode. When the player application signals the content retransmitter to decrease the resolution to LD mode, the player application may play the substitute content instead of the received content.

In some implementations, the player application may periodically locate and obtain substitute content when receiving content from the content retransmitter 102 even before the player application signals the content retransmitter to decrease the resolution to a resolution level that is below the minimum threshold resolution level. In such implementations, the player application may record the substitute content in the storage medium 110 so that it is subsequently available when the player application signals the content retransmitter to decrease the resolution to a resolution level that is below the minimum threshold resolution level. In other implementations, when the player application signals the content retransmitter 102 to decrease the resolution to a resolution level that is below the minimum threshold resolution level, the player application may then locate and obtain the related substitute content to play instead of the received content.

In various implementations, the player application may switch between playing the received content and substitute content without user interaction. However, in other implementations, the player application may prompt a user before switching from playing received content to substitute content, substitute content to received content, and so on. In such implementations, if the prompted user does not enter input via the input/output device(s) 111, the player application may continue to play whichever content is currently being played regardless of the current resolution level, bandwidth, and so on.

Although the transmission media 103 and 106 are illustrated and described as two separate transmission media, it should be understood that in various implementations transmission media may be one or more connected or unconnected transmission media.

Figure 2A:
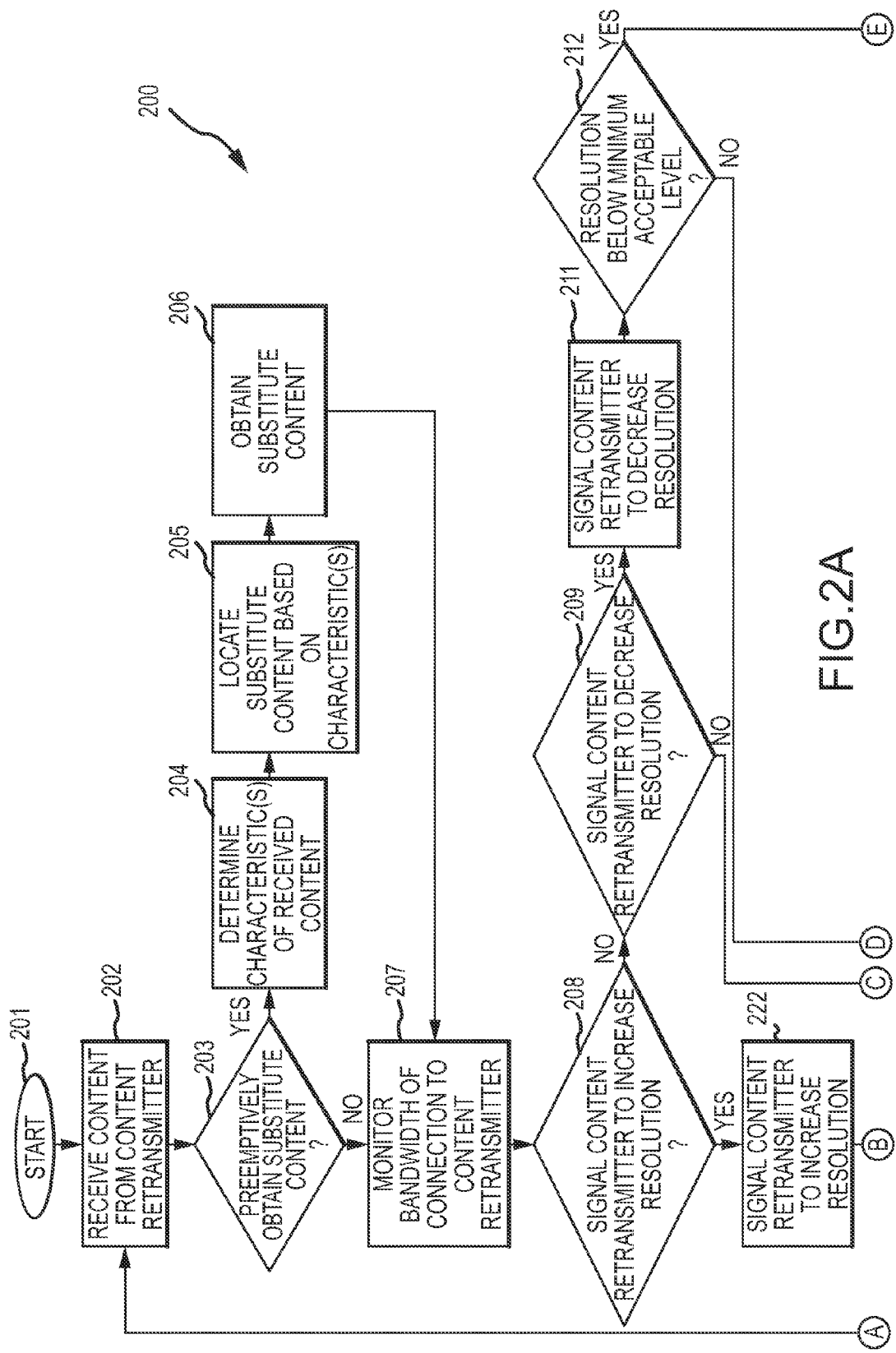
FIGS. 2A and 2B are a flow chart illustrating a method for handling disruption in content streams received at a player device from a content retransmitter. This method may be performed by the system of FIG. 1.
Figure 2B:
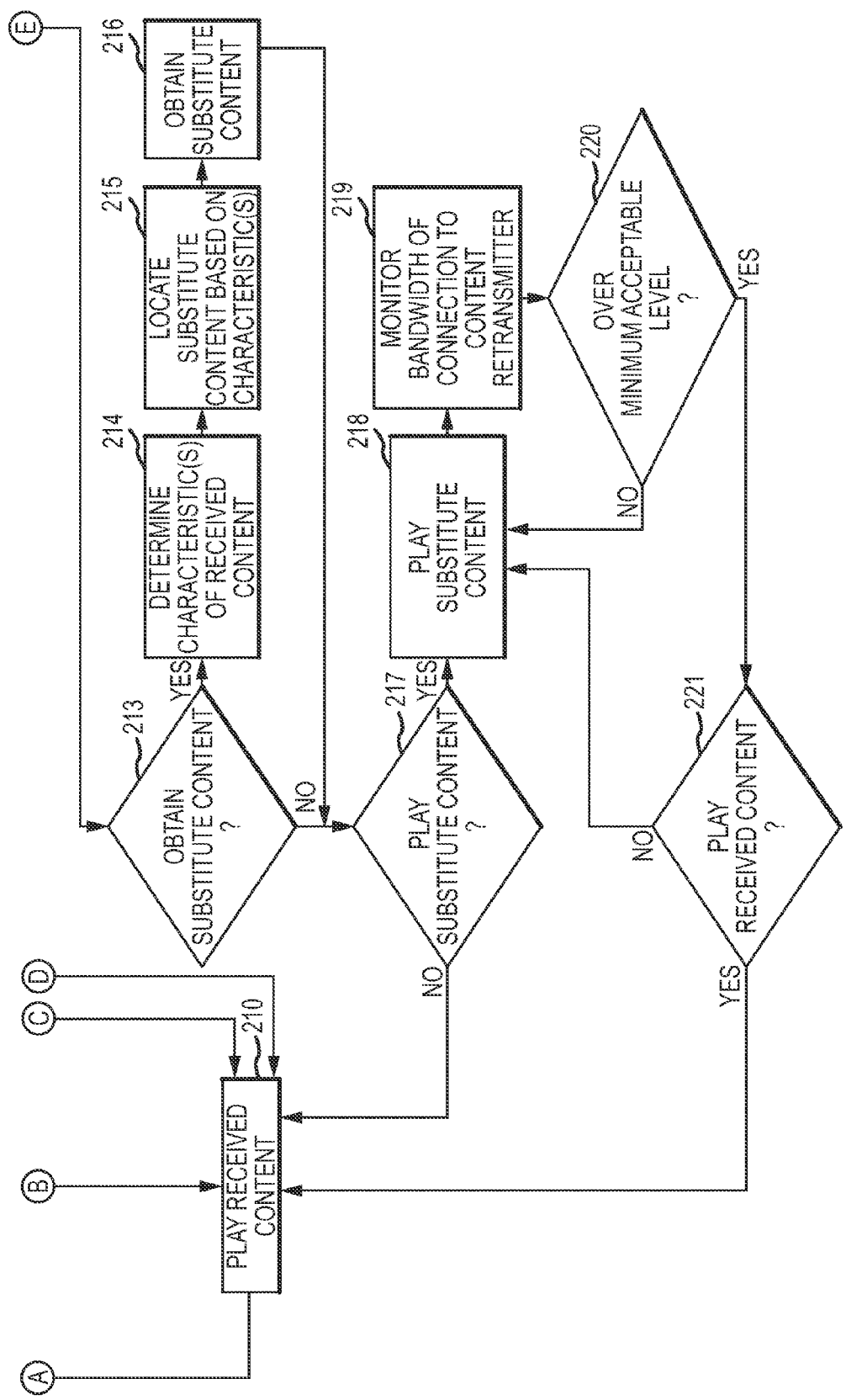

FIGS. 2A and 2B illustrate a method 200 for handling disruption in content streams received at a player device from a content retransmitter. The method 200 may be performed by a player application executed by the player device 101 of FIG. 1. The flow begins at block 201 and proceeds to block 202 where the player application receives content from the content retransmitter 102. The flow then proceeds to block 203 where the player application determines whether or not to preemptively obtain substitute content related to the received content based on one or more determined characteristics of the received content. The player application may preemptively obtain substitute content so that it is readily available instead of obtaining the substitute content when it is needed. If so, the flow proceeds to block 204. Otherwise, the flow proceeds to block 207.

At block 204, the player application determines one or more characteristics of the received content. The flow then proceeds to block 205 where the player application locates substitute content that includes the one or more characteristics. Next, the flow proceeds to block 206 where the player application obtains the located substitute content before the flow proceeds to block 207.

At block 207, the player application monitors the bandwidth of the communication connection utilized to receive the content. The flow then proceeds to block 208. At block 208, the player application determines whether or not to signal the content retransmitter 102 to increase the resolution level for encoding future portions of the content. If so, the flow proceeds to block 222. Otherwise, the flow proceeds to block 209.

At block 209, after the player application determined not to signal the content retransmitter to increase the resolution level, the player application determines whether or not to signal the content retransmitter 102 to decrease the resolution level for encoding future portions of the content. If not, the flow proceeds to block 210 where the player application plays the received content before the flow returns to block 202. Otherwise, the flow proceeds to block 211 where the player application signals the content retransmitter to decrease the resolution level. The flow then proceeds to block 212 where the player application determines whether or not the decreased resolution level is below the minimum threshold resolution level. If not, the flow proceeds to block 210. Otherwise, the flow proceeds to block 213.

At block 213, the player application determines whether or not to obtain substitute content related to the received content. If so, the flow proceeds to block 214. Otherwise, the flow proceeds to block 217. At block 214, the player application determines one or more characteristics of the received content. The flow then proceeds to block 215 where the player application locates substitute content that includes the one or more characteristics. Next, the flow proceeds to block 216 where the player application obtains the located substitute content before the flow proceeds to block 217.

At block 217, the player application determines whether or not to play obtained substitute content. If not, the flow proceeds to block 210 where the player application plays the received content. Otherwise, the flow proceeds to block 218 where the player application plays the obtained substitute content. Next, the flow proceeds to block 219 where the player application monitors the bandwidth of the communication connection utilized to receive the content. The flow then proceeds to block 220 where the player application determines f the bandwidth has increased such that the player application signals the content retransmitter 102 to increase the resolution level to a level that is not below the minimum resolution level. If not, the flow returns to block 218 where the player application continues playing the substitute content. Otherwise, the flow proceeds to block 221.

At block 221, the player application determines whether or not to play the received content instead of the substitute content. If so, the flow proceeds to block 210 where the player application plays the received content. Otherwise, the flow returns to block 218 where the player application continues playing the substitute content.

At block 222, after the player application determines to signal the content retransmitter 102 to increase the resolution level for encoding future portions of the content, the player application signals the content retransmitter to increase the resolution level. The flow then proceeds to block 210 where the player application plays the received content before the flow returns to block 202.

Returning to FIG. 1, when the player application determines to play substitute content instead of received content, the player application may signal the content retransmitter 102 to record the content in the storage medium 114 and/or the content receiver 104 to store the content in the storage medium 118. Thus, the content may be available to be provided from the storage medium 114 and/or the storage medium 118 when the bandwidth of the communication connection improves.

When the player application locates substitute content related to the received content, the player application may determine one or more characteristics of the received content in a number of ways. For example, the player application may analyze metadata that is included in the received content such as metadata stored in a vertical blanking interval; analyze metadata that describes the received content such as metadata included in one or more electronic programming guides; analyze captioning data for the received content such as captioning of the audio portion of the received content; performing audio recognition on the received content to identify words that are spoken in the received content; perform image recognition to identify persons, places, things; and so on that are present in the received content, and so on. The player application may then locate related substitute content by searching for available content that includes one or more of the determined characteristics of the received content. For example, if metadata included in the received content describes that the received content is a historical program about pirates, the player application may search available content for a different historical program about pirates.

When the player application locates substitute content related to the received content, the player application may make use of one or more user preferences (which may be stored in the storage medium 110) in addition to the determined characteristics of the received content to guide searching. These user preferences may include a variety of user specified rules as to what available content to select as substitutes for received content. Such preferences may include rules concerning locations to search for available content, rules concerning content ratings of available content, rules concerning relevance of content description comparisons, and so on. By way of a first example, a rule may specify to search available content of the player device 101 before searching available content via an Internet search engine. By way of a second example, a rule may specify not to select content with a rating indicating that the content includes graphic violence. By way of a third example, a rule may specify that multiple exact words must match when comparing content descriptions in order for available content to be considered relevant.

Figure 3A:
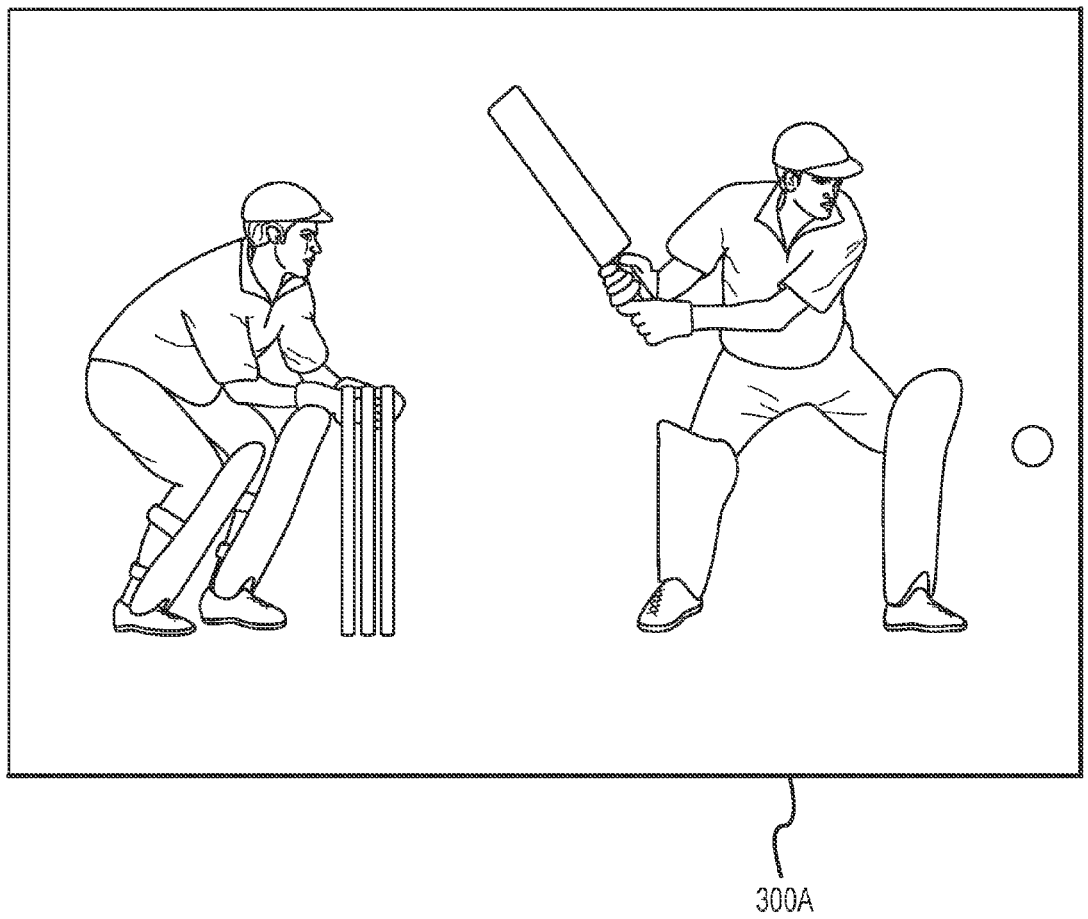
FIGS. 3A-3C illustrate sample display screens that may be displayed by the system of FIG. 1 while performing the method of FIG. 2.
Figure 3B:
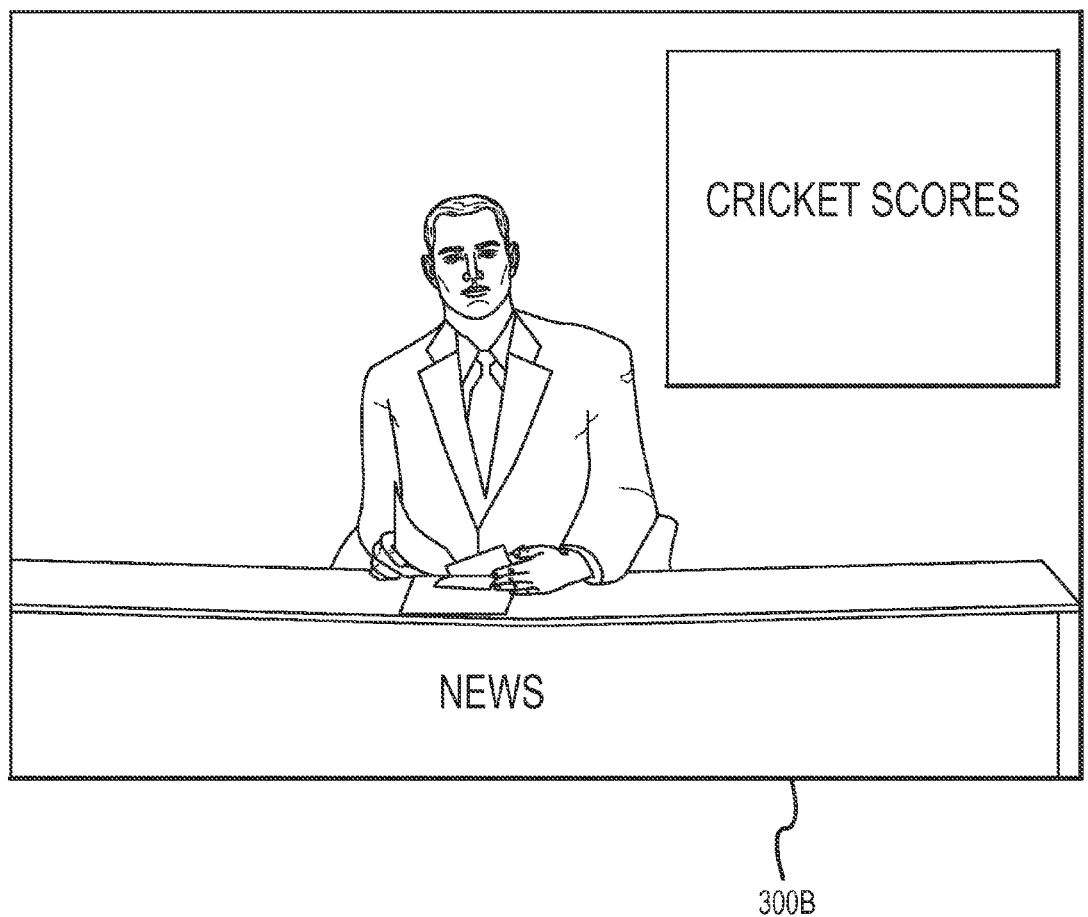
Figure 3C:
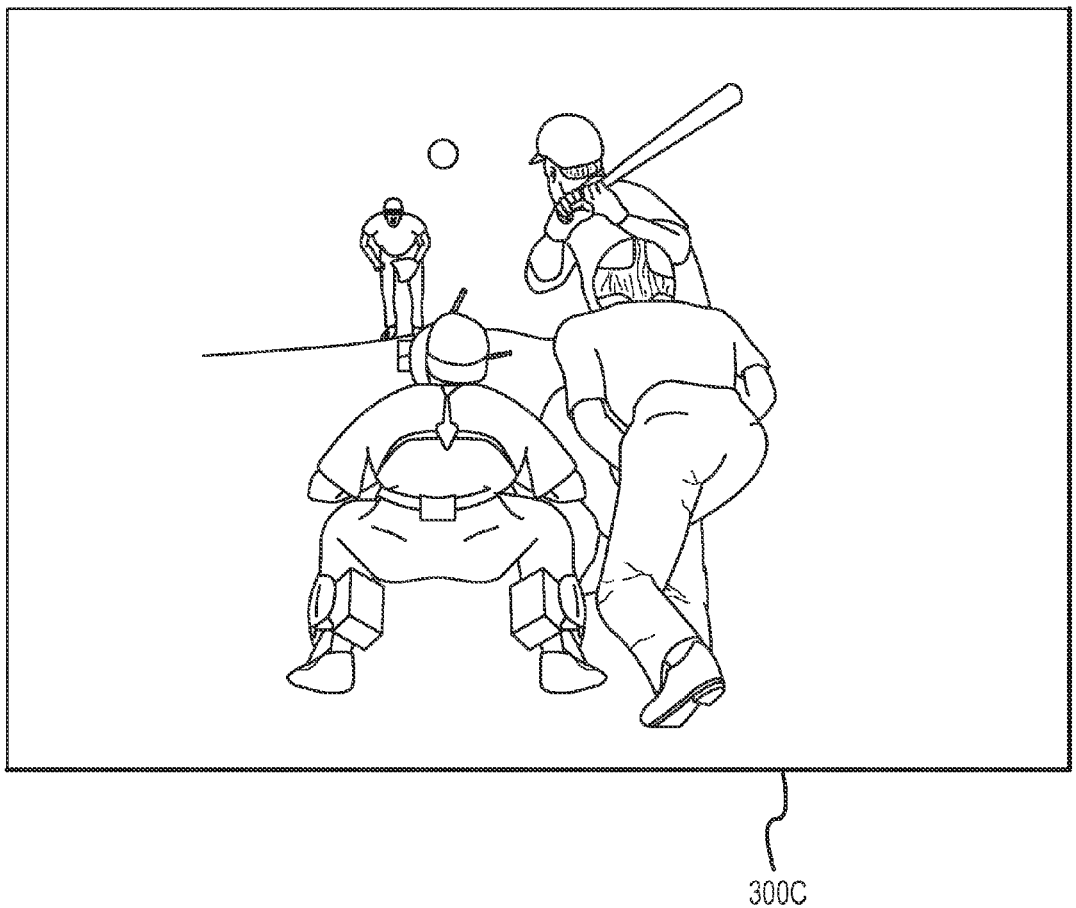

FIGS. 3A-3C illustrate sample display screens 300A-300C that may be displayed by the player device 101 while the player application performs the method 200. FIG. 3A is a sample display screen 300A depicting a cricket match. A player application executing on the player device may receive encoded content from the content retransmitter 102 and may decode, render, and play the content on a input/output device 111 such as a LCD (liquid crystal display) screen incorporated into the player device. Thus, the sample display screen 300A depicting the cricket match may be displayed on the LCD screen.

While playing the received content, e.g., the cricket match, the player application may analyze captioning data included in the content to determine that the received content relates to cricket. The player application may then search the content server 107 for available content related to cricket. For example, as a result of the search, the player application may locate and obtain substitute content that includes a sports news show that discusses cricket games and the current scores of such games. The player application may store the obtained substitute content in the storage medium 110 so that it is available when needed.

Further, during play, the player application may determine that the bandwidth of the connection utilized to receive the content has decreased such that the player application signals the content retransmitter to decrease the resolution level of future portions of the content to a level below a minimum acceptable level. As such the player application may play the substitute content related to the sports news show stored in the storage medium instead of the received content of the cricket game, as depicted by sample display screen 300B in FIG. 3B. Subsequently, when the player application determines that the bandwidth of has increased such that the player application signals the content retransmitter to increase the resolution level to a level not below the minimum acceptable level, the player application may resume playing the received content including the cricket match, as depicted by sample display screen 300A in FIG. 3A.

However, the sports news show may include the current score of the cricket game included in the received content. Thus, if the sports news show is presented as substitute content instead of the cricket game, the cricket game may be spoiled for the user. As such the user may have specified in user preferences not to select substitute content that includes sporting scores when selecting substitute content for sporting event content. Therefore, in this case, when the player application searched the content server 107 for available content related to cricket, the player application may not have selected the sporting news show as the substitute content based on the user preferences. Instead, the player application may locate and obtain substitute content that includes a baseball game as both cricket and baseball are sporting events. When the substitute content including the baseball game is then played instead of the received content including the cricket match, the sample display screen 300C in FIG. 3C may thusly be displayed.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for handling disruption in content streams received at a player device from a content retransmitter, the method comprising:
   a player device monitoring bandwidth of a communication connection utilized to receive a first portion of content at the player device from the content retransmitter wherein the first portion of content is encoded at a first resolution level;
   the player device signaling the content retransmitter to encode a second portion of the content at a second resolution level when the player device determines that the bandwidth of the communication connection has decreased below a threshold value;
   the player device locating substitute content that is related to the first portion of the content by determining at least one characteristic of the content and selecting the substitute content by searching available content based on the at least one characteristic, wherein said operation of determining at least one characteristic of the content comprises at least one of: analyzing metadata describing the content, analyzing metadata included in the first portion of the content, analyzing captioning data for the first portion of the content, performing audio recognition on the first portion of the content, or performing image recognition on the first portion of the content; and
   the player device obtaining the substitute content to present instead of the second portion of the content when the second resolution level is below a minimum threshold resolution level.

2. The method of claim 1, further comprising presenting the substitute content instead of the second portion of the content when the second resolution level is below the minimum threshold resolution level.

3. The method of claim 2, further comprising receiving a user input specifying to present the substitute content instead of the second portion of the content.

4. The method of claim 2, further comprising signaling content retransmitter to record at least the second portion of the content.

5. The method of claim 1, wherein said operation of selecting the substitute content by searching available content based on the at least one characteristic further comprises selecting the substitute content by searching available content based on the at least one characteristic and at least one user preference.

6. The method of claim 1, wherein the player device determines that the bandwidth of the communication connection has decreased below the threshold value by measuring a number of frames of the first portion of the content dropped by the player device during at least one of decoding the first portion of the content or rendering the first portion of the content.

7. The method of claim 1, further comprising:
   after the player device signals the content retransmitter to encode the second portion of the content at the second resolution level, signaling the content retransmitter, utilizing the player device, to encode a third portion of the content at a third resolution level when the player device determines that the bandwidth of the communication connection has increased above the threshold value; and
   determining to present the third portion of the content instead of the substitute content, utilizing the player device, when the third resolution level is not below the minimum threshold resolution level.

8. The method of claim 1, wherein said operation of obtaining, utilizing the player device, the substitute content to present instead of the second portion of the content when the second resolution level is below a minimum threshold resolution level is performed prior to the player device determining that the bandwidth of the communication connection has decreased.

9. A player device comprising:
   at least one communication component that receives a first portion of content from the content retransmitter via at least one communication connection where in the first portion of the content is encoded at a first resolution level; and
   at least one processing unit, communicably coupled to the at least one communication component, that monitors by the player device, bandwidth of the communication connection, locates substitute content that is related to the first portion of the content, and obtains the substitute content via the communication component, wherein the locating substitute content includes determining at least one characteristic of the content and selecting the substitute content by searching available content based on the at least one characteristic, wherein said operation of determining at least one characteristic of the content comprises at least one of: analyzing metadata describing the content, analyzing metadata included in the first portion of the content, analyzing captioning data for the first portion of content, performing audio recognition on the first portion of content, or performing image recognition on the first portion of content, wherein the at least one processing unit signals the content retransmitter via the at least one communication connection to encode a second portion of the content at a second resolution level when the at least one processing unit determines that the bandwidth has decreased below a threshold value and wherein the at least one processing unit presents the substitute content to at least one presentation device instead of the second portion of the content when the second resolution level is below a minimum threshold resolution level.

10. The player device of claim 9, wherein the at least one processing unit searches available content via the at least one communication component based at least on the at least one characteristic and at least one user preference regarding content substitutes.

11. The player device of claim 9, wherein the at least one processing unit presents a third portion of the content received from the content retransmitter via the at least one communication component to the at least one presentation device after presenting the substitute content to the at least one presentation device instead of the second portion of the content wherein a resolution level of the third portion of the content is not below the minimum threshold resolution level.

12. The player device of claim 9, wherein the at least one processing unit obtains the substitute content prior to determining that the bandwidth has decreased below the threshold value.

13. The player device of claim 9, wherein the at least one processing unit signals the content retransmitter via the at least one communication connection to record at least a portion of the content when the second resolution level is below the minimum threshold resolution level.

14. The player device of claim 9, wherein the at least one presentation device is incorporated into the player device.

15. The player device of claim 9, further comprising a user input component, communicably coupled to the at least one processing unit, the at least one processing unit presents the substitute content to the at least one presentation device instead of the second portion of the content when the second resolution level is below the minimum threshold resolution level and a user input specifying to present the substitute content is received via the user input component.

16. A non-transitory computer-readable medium having computer processor executable instructions thereon that, when executed, cause at least one computer processor to:
- monitor by a player device bandwidth of a communication connection utilized to receive the first portion of content at the player device from the content retransmitter wherein the first portion of content is encoded at a first resolution level;
- signal by the player device, the content retransmitter to encode a second portion of the content at a second resolution level when the player device determines that the bandwidth of the communication connection has decreased below a threshold value;
- locate by the player device, substitute content that is related to the first portion of the content by determining at least one characteristic of the content and selecting the substitute content by searching available content based on the at least one characteristic, wherein said operation of determining at least one characteristic of the content comprises at least one of: analyzing metadata describing the content, analyzing metadata included in the first portion of the content, analyzing captioning data for the first portion of the content, performing audio recognition on the first portion of the content, or performing image recognition on the first portion of the content; and
- obtain by the player device, the substitute content to present instead of the second portion of the content when the second resolution level is below a minimum threshold resolution level.

\* \* \* \* \*